Dec. 15, 1925.

I. MARKS 1,566,030

POWER SHOVEL CONSTRUCTION

Filed April 13, 1925

Inventor
Isidore Marks
by his attorney

Patented Dec. 15, 1925.

1,566,030

UNITED STATES PATENT OFFICE.

ISIDORE MARKS, OF DORCHESTER, MASSACHUSETTS, ASSIGNOR TO KEYSTONE MFG. CO., OF SOUTH BOSTON, MASSACHUSETTS, A CORPORATION OF MASSACHUSETTS.

POWER-SHOVEL CONSTRUCTION.

Application filed April 13, 1925. Serial No. 22,568.

*To all whom it may concern:*

Be it known that I, ISIDORE MARKS, a citizen of the United States, residing at Dorchester, in the county of Suffolk and State of Massachusetts, have invented certain new and useful Improvements in Power-Shovel Construction, of which the following is a specification.

The present invention relates to power shovels and is particularly applicable to toy power shovel constructions that are copies, so far as possible, of the standard constructions.

One object of the invention is to provide a novel type of shovel arm and means for operating it that are particularly adapted to loading a dump body truck. Accordingly a feature of the invention comprises a shovel arm of the telescopic type that is normally collapsed, with a single means under control of the operator for causing the arm to dig and then to extend before dumping the shovel load.

To the accomplishment of this object, and such others as may hereinafter appear, the various features of the present invention relate to certain devices, combinations and arrangements of parts fully set forth hereinafter, the advantages of which will be readily understood by those skilled in the art..

Figure 1:
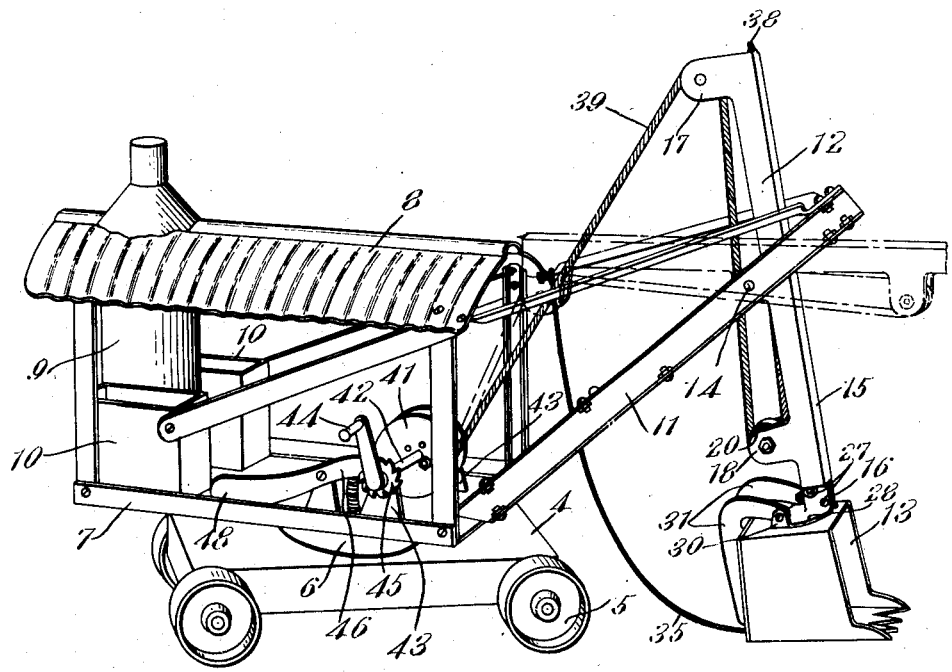
Figure 2:
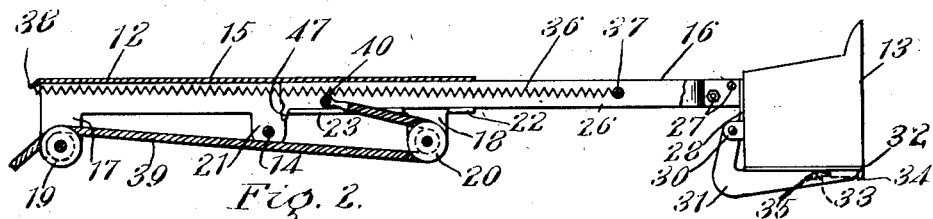
Figure 3:
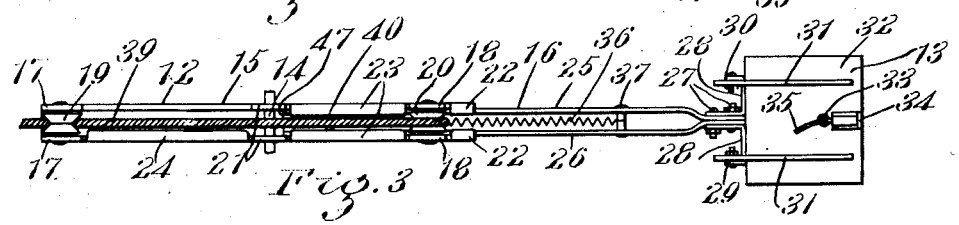

The various features of the present invention will be best understood from an inspection of the accompanying drawings illustrating the preferred form of the invention as applied to a toy, in which, Figure 1 is a perspective of the complete power shovel construction, Fig. 2 is a detail in elevation, partly in section, of the shovel, its telescopic arm and the means for both lengthening and shortening the shovel arm, and Fig. 3 is a bottom plan of the shovel and the telescopic arm therefor.

The mechanism is mounted upon a platform comprising a small truck 4 provided with wheels 5 (Fig. 1). Carried by a turn table 6 mounted to rotate on the truck 4 is an imitation power plant 7 comprising a shed 8, a boiler 9, and a pair of rectangular boxes 10 simulating a fuel bin and a reciprocating engine. Secured to the floor of the shed 8 is an inclined boom 11 upon which a telescopic arm 12 for the shovel 13 is pivoted at 14. The shovel arm 12 comprises two connected arms, one of which, the arm 15, turns on the boom 11, and the other one of which, the arm 16, carries the shovel 13.

The arm 15 is stamped out of sheet metal and then bent to form a three-sided channel having integral depending tabs 17 and 18 (Fig. 2) constituting supports for the sheaves 19 and 20. A third depending set of tabs 21 engages the pivot 14. The open side of the channel in the arm 15 is partially closed by a pair of lateral tabs 22, a pair of lateral tabs 23, and a single tab 24 (Fig. 3). These tabs 22, 23, and 24 constitute ways upon which the arm 16 slides within the channel in the arm 15.

The arm 16 comprises two sheet metal plates 25 and 26 (Fig. 3) spaced apart but joined together at one end by bolts 27 extending through the plates and a pair of brackets 28 on the rear wall of the shovel 13. The brackets 28 are provided with ears 29 and 30 upon which two arms 31 are pivoted. The arms 31 carry a plate 32 which constitutes a closure for the shovel 13. The plate or closure 32 is locked in closed position by a freely sliding bolt 33, carried by the plate, and arranged to engage a socket formed in an ear 34 on the shovel 13. The bolt 33 is withdrawn to release the plate or closure by a rope 35 one end of which is connected to the closure and the other end of which is connected to the roof of the shed 8.

The arms 15 and 16 are normally held in a collapsed position (Fig. 1) by a coiled spring 36 one end of which is secured to a pin or rivet 37 carried by the plates 25 and 26. The other end of the spring 36 is connected to a tail 38 formed on the arm 15.

In order to operate the shovel and cause it to move from the position of Fig. 1 to that of Fig. 2, a cable 39 is connected to a pin or rivet 40 carried by the plates 25 and 26 of the arm 16. The cable 39 passes over the sheaves 19 and 20 on the arm 15 to a winding drum comprising thin sheave 41 constructed to wind the cable 39 spirally thereon and thus maintain the shovel arm 12 central. The sheave 41 is mounted on a shaft 42 journaled in bearings 43 carried by the floor of the shed 8. The shaft 42 is rotated to wind the cable on the sheave 41 by a crank 44 secured to the shaft. A ratchet 45 on the shaft 42 is engaged by a spring pressed pawl 46 to prevent the cable from unwinding on the sheave when the crank 44 is released. Winding the cable 39 on the sheave 41 through the rotation of the crank 44 turns the shovel arm 12 on the pivot 14 and thus elevates the shovel 13 from the vertical position of Fig. 1 to a horizontal position. During this movement of the shovel the arms 15 and 16 remain telescoped as the sheaves 19 and 20 snub the cable 39 and prevent the cable 39 from drawing the arm 16 out of the arm 15. When the shovel is elevated into a horizontal position the positions of the sheaves 19 and 20 relatively to the direction of pull on the cable 39 change and the cable 39 is permitted to run freely over the sheaves. Further pull on the cable 39 through the rotation of the crank 44 draws the arm 16 out of the arm 15 to move the shovel 13 over the sides of the body of a toy dump truck and locate the shovel in a position such that when the rope 35 is pulled to release the bolt 33 the contents of the shovel are dumped into the body of the toy dump truck. Movement of the arm 16 out of the arm 15 is limited by a tail 47 (Fig. 2) on the plate 25 which engages the end of one of the tabs 23 and stops the outward movement of the arm 16.

During the rotation of the crank 44 the cable 39 turns the shovel arm 12 about the pivot 14 to cause the shovel to dig through any interposed pile of soft loose material and bring the trapped material to the dumping level. The cable 39 then pulls the arm 16 out of the arm 15 to move the shovel along the dumping level to the place of deposit over the body of a toy dump track. A pull on the rope 35 unlatches the closure 32 thus dumping the contents of the shovel into the body of the toy dump truck. The shovel may then be returned automatically to the position of Fig. 1 by pressing upon a tail 48 on the pawl 46. When the pawl 46 is released the spring 36 telescopes the arms 15 and 16, the weight of the shovel 13 overbalances the shovel arm 12, and the shovel returns to the normal position of Fig. 1 ready for another digging operation. The plate or closure 32 drops by gravity over the shovel opening and the bolt 33 is shot home by gravity thus locking the closure automatically.

It will be clear to those skilled in the art and with the general object of the present invention in view, that changes may be made in the details of structure, the described and illustrated embodiment being intended as an exploitation of its underlying essentials the features whereof are definitely stated in their true scope in the claims herewith.

What is claimed as new, is:

1. A power shovel construction having, in combination, a shovel, a boom, a pair of arms forming a telescopic shovel arm pivoted on the boom, a spring for normally holding the arms telescoped when the shovel is in a position ready for digging, means for operating the shovel to swing it on its pivot to dig and then upward to a dumping level and for relatively moving the arms to locate the shovel over the place of deposit whereby said spring is extended, and means for holding the arms extended that is releasable for returning the shovel arms to their normal position under the influence of said spring.

2. A power shovel construction having, in combination, a boom, a two part telescopic shovel arm pivoted to the boom having a shovel on one part, means for successively turning the shovel arm on its pivot and extending the shovel arm to move the shovel from a digging position to a place of deposit, and means mounted wholly on the shovel arm for successively telescoping the extended shovel arm and turning the shovel arm about its pivot in returning the shovel to its digging position.

3. In a power shovel construction, a telescopic arm one part of which carries a shovel and the two parts of which are maintained normally in collapsed relation by a contractile spring connecting both parts, a cable attached at one end to one part, guide means for the cable on the other part providing for an extension of said shovel and said spring when the free end of the cable is pulled, and releasable means for holding the two parts of the arm extended against the collapsing force of said spring.

4. A power shovel construction comprising a platform, a boom supported on the platform, a telescopic shovel arm pivoted on the boom one part of which carries a shovel at its outer end and both parts of which are held collapsed by a contractile spring connected at its ends to the two parts respectively, the weight of the shovel normally maintaining the collapsed arm in a substantially vertical digging position, a winding drum on the platform, a cable having one end attached to the drum and its other attached to the shovel part of said arm passing over and under sheaves at the rear and forward ends respectively of the other part, and means for rotating said drum to wind the cable thereon.

5. A power shovel construction having, in combination, a shovel, a boom, a telescopic shovel arm pivoted on the boom, a spring for normally maintaining the shovel arm telescoped, and a single means for turning the shovel arm on its pivot and extending the shovel arm.

6. A power shovel construction having, in combination, a shovel, a boom, a sheet metal arm pivoted on the boom bent to form a three-sided channel with lateral tabs extending partially across the fourth side to constitute ways, a second arm connected to the shovel and mounted within the first arm to slide over the ways therein, a coiled spring connecting the arms, and a single means for sliding the second arm on the ways against the tension of the spring and turning the first arm on its pivot.

ISIDORE MARKS.